June 1, 1965 P. H. REDFIELD 3,186,020
CLEANING ATTACHMENT FOR MIXERS
Filed Feb. 14, 1963 2 Sheets-Sheet 1

INVENTOR.
PAUL H. REDFIELD
BY Braddock and Braddock
ATTORNEYS

June 1, 1965 P. H. REDFIELD 3,186,020
CLEANING ATTACHMENT FOR MIXERS
Filed Feb. 14, 1963 2 Sheets-Sheet 2
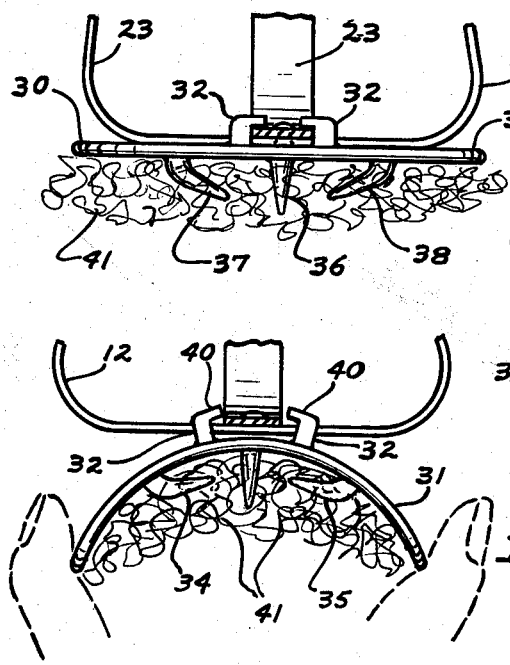
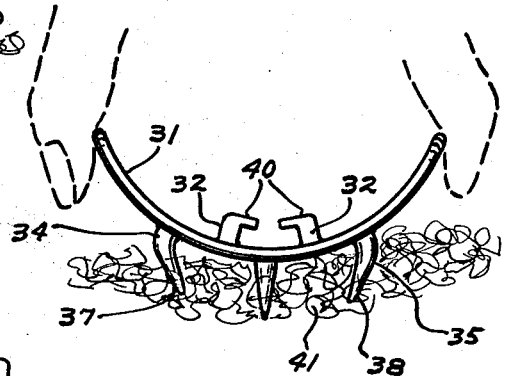
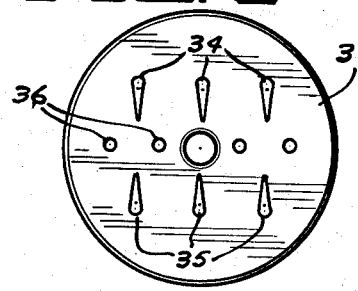
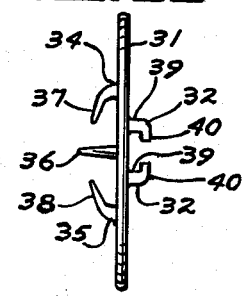
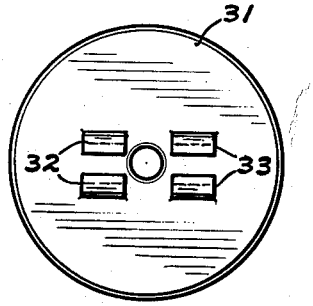
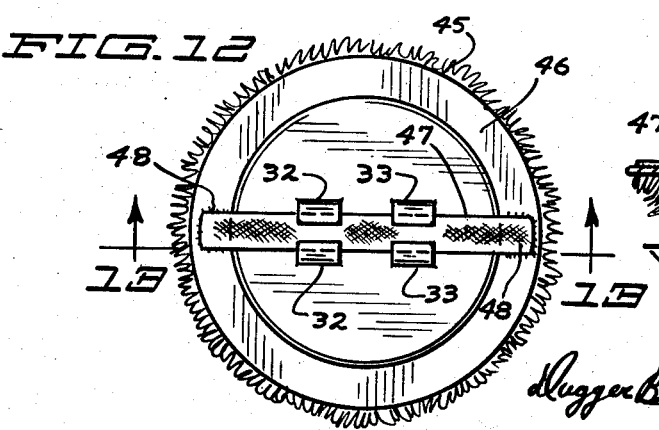
INVENTOR.
PAUL H. REDFIELD
BY
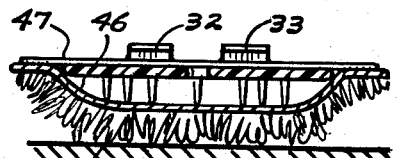
ATTORNEYS

3,186,020
CLEANING ATTACHMENT FOR MIXERS
Paul H. Redfield, R.R. 3, Madison, S. Dak.
Filed Feb. 14, 1963, Ser. No. 258,966
5 Claims. (Cl. 15—230.19)

This application is a continuation-in-part of my copending application for Cleaning Attachment for Mixers, Serial No. 192,388, filed May 4, 1962.

The present invention has relation to cleaning attachments and more particularly to an attachment that can be readily installed onto the beater of a kitchen mixer and used for various cleaning operations in the home.

Housewives long have been faced with the problem of cleaning dirty baking and frying pans. Food becomes encrusted on the pans and is very difficult to remove. Of course various scrapers have been advanced, all of which require a considerable amount of physical effort to use and do not greatly reduce dishwashing time.

The device made according to the present invention, in the form as disclosed, presents a simple attachment that can be slipped onto a beater of a power driven food mixer and used for polishing, scraping and other cleaning chores in the house. The powered rotating action of the mixer does all of the work. The attachment is easily slipped on and off the beater as desired.

The attachment is made of a flexible material so that it can be used in cleaning out corners of pans as well as flat surfaces.

A second form of the invention presents a cleaning device holder for mixers which is easily attached to beaters for driving. The holder can be adapted to be used with a number of implements such as scouring pads, scraping pads, steel wool, or polishing attachments. The implements are interchangeable on the holder and are easily removed and replaced. Thus the attachment is adapted to be used for a wider number of tasks.

It is an object of the present invention to present an easily installed cleaning attachment for kitchen mixers.

In the drawings,

FIG. 6 is a fragmentary side elevational view of a rotary beater showing a cleaning attachment made according to a second form of the present invention installed thereon;

FIG. 7 is a side elevational view of the cleaning device holder of FIG. 6 when it is in position for attaching a scouring pad thereto;

FIG. 8 is a side elevational view of the cleaning attachment of FIG. 6 illustrated in position to be installed on a beater;

FIG. 9 is a bottom plan view of the cleaning device holder of FIG. 7;

FIG. 10 is a side elevational view of the device of FIG. 9;

FIG. 11 is a top plan view of the device of FIG. 9;

FIG. 12 is a top plan view similar to FIG. 6 showing a polishing head installed on the cleaning device holder; and FIG. 13 is a sectional view taken as on line 13—13 in FIG. 12.

Figure 1:
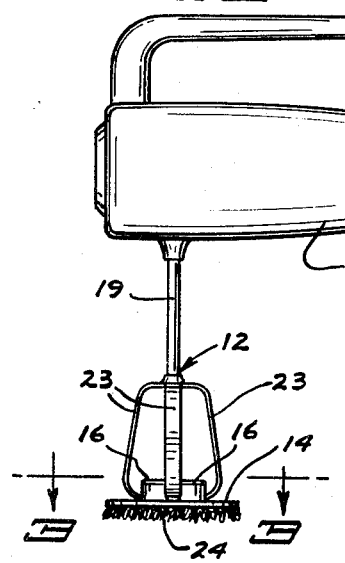
FIG. 1 is a side elevational view of a kitchen mixer having a cleaning attachment made according to the present invention installed on a beater thereof.

Referring to FIGS. 1 through 5 and the numerals of reference thereon, a kitchen mixer 10 is connected through a cord 11 to a suitable source of electric power (not shown). The mixer may be turned on to drive a rotary beater 12. A power cleaning attachment illustrated generally at 13 may be attached to the beater. Most kitchen mixers have two output shafts. The attachment preferably is attached to the beater that rotates counterclockwise. As shown only one beater is used in the mixer when the cleaning attachment is used. The beater is constructed with a shank 19 and four blade-like members 23 intersecting at the bottom of the beater and integral with the shank.

The cleaning attachment includes a relatively flat flexible disc-like member 14 that has an integral raised boss 15 in the rotational center thereof. The boss 15 is divided into four boss segments 16 by a pair of diametral slots 17 that extend at right angles to each other and that intersect over the center of rotation of the attachment. The slots 17 extend downwardly through the boss to an upper surface 20 of the disc-like member 14.

The boss segments 16 each are provided with a plurality of inwardly projecting opposed teeth-like members 21 that project into slots 17 and which form a plurality of receptacles 22. The receptacles 22 are of configuration to fit the individual flat blade-like members 23 of the beater. The receptacles 22 in each slot are transversely alined so that the attachment will be held securely.

By having a plurality of receptacles the beater blade can be held in two different positions, one adjacent the upper surface 20 of the disc-like member 14 and the other spaced from this surface. This provides a safety feature in that if the beater slips out of the lower of the receptacles 22 the upper receptacles will hold the attachment in place and it will not fly off.

The projections 21 are flexible so that the beater can be installed by sliding it down past the projections, which will deflect out of the way and then will resiliently move to their position as shown in FIG. 1 to hold the beater in place. To remove the scouring attachment it is merely pulled off the beater. The projection 21 will deflect to permit this.

Figure 2:
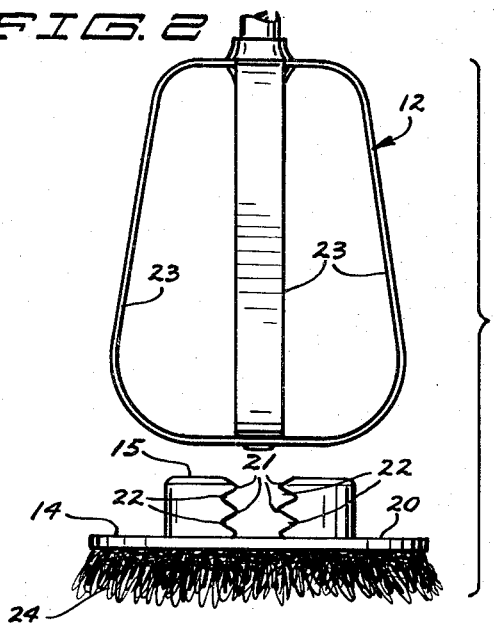
FIG. 2 is a fragmentary enlarged exploded view of a beater with a cleaning attachment made according to the present invention removed therefrom and in position to be installed.

As can be seen in FIGS. 1 and 2, the beater may have a scouring pad 24 installed thereon. This can be used for scouring pots and pans as desired.

Figure 4:
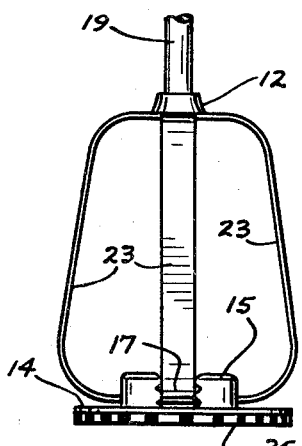
FIG. 4 is a side elevational view of a beater having a cleaning attachment installed thereon, said cleaning attachment comprising a scraper.

Also, as seen in FIG. 4, a scraper attachment can be made by integrally attaching a scraper 25 to the bottom surface of the flat disc-like member 14. This can be used for heavy, baked-on material that is not easily removed.

Figure 5:
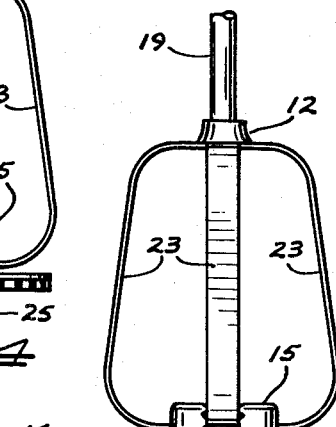
FIG. 5 is a side elevational view of a beater having a cleaning attachment made according to the present invention installed thereon, said cleaning attachment comprising a polishing brush.
Figure 3:
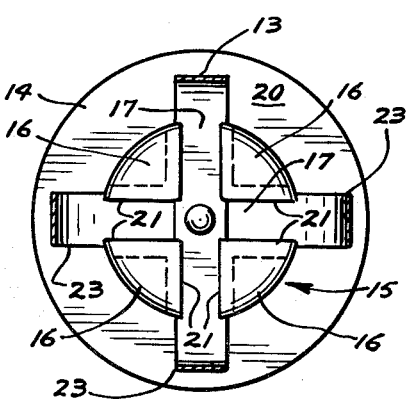
FIG. 3 is an enlarged sectional view taken as on line 3—3 in FIG. 1.

In addition, as can be seen in FIG. 5, a polishing brush 26 can be made integral with the disc-like member 14 and used for polishing counter surfaces or for polishing pans if desired.

The rotary attachment does a thorough job without any appreciable effort on the part of the user and thus lightens kitchen chores.

If desired, the attachment can be used with a knife sharpening attachment also. The mixer motor supplies all of the power and the user need only guide the attachment to its desired locations in order to accomplish the job of cleaning.

The boss 15 with the transverse slot makes the attachment easily installed and replaced and positively locks it in place. With the added safety feature of two receptacles there is no chance for losing the attachment during use.

Referring to FIGS. 6 through 11 and a second form of the invention shown therein, a beater 12 has four blade members 23, as in the first form of the invention and a cleaning device holder 30 is attached thereto. The holder 30 comprises a flat disc 31, which is made of a suitable flexible material, such as polyethylene, and has two pairs of lugs 32, 32 and 33, 33, respectively, attached to the upper surface thereof. The flat disc 31 has first and second side rows of prongs 34 and 35, respectively, and a center row of prongs 36, all of which are attached to the bottom surface thereof and extending downwardly therefrom. Each of the side rows of prongs have lower end portions 37 and 38, respectively which extend downwardly and inwardly toward the center row of prongs. The lower end portions of the first and second rows of prongs 34 and 35 face each other in this manner. The center row of prongs 36 is substantially perpendicular to the bottom surface of the flat disc when it is in its planar condition.

The lugs 32 and 33 are each comprisesd as a shank 39 and a tip portion 40 that extends at right angles to the shank and faces the other lug of the pair. The tip members hold the disc onto the beater.

The holder 30 is adapted to hold and drive any number of different types of cleaning or polishing devices. As shown, a scouring pad 41 is attached to the holder. However, polishing brushes, scrapers, steel wool or other cleaning utensils normally found in the kitchen under different trade names can be used.

In order to install a cleaning device comprised as a scouring pad 41 onto the holder, the flat disc 31 is bent into a U-shape as shown in FIG. 7. This causes the first and second side rows of prongs 34 and 35 to be bent outwardly away from the center row. The end portions 37 and 38 of the prongs, respectively, come to position wherein they extend substantially straight downwardly from the normal position of the disc 31. The pad 41 is then pushed onto the prongs and the disc is released. The disc then will return to its planar position as shown in FIG. 6 and the prongs will be embedded into the scouring pad and will prevent the pad from being removed. Also the center row of prongs 36 keeps the pad from bunching up and sliding out of place.

In order to install the holder and scouring pad onto a beater 12 the disc 31 is bent in a reverse U shape as shown in FIG. 8. The outside rows of prongs 34 and 35, respectively, bite into the scouring pad 41 and the pairs of lugs 32, 32 and 33, 33 are spread apart. The lugs can then be slipped over the blade portions 23 of the beater 12. The flat disc is released, it returns to its planar position and the holder is securely held in driving relationship to the beater.

The holder 30 can be easily installed and removed from the beater and also different scouring or cleaning devices can be easily placed on the holder merely by bending the disc 31 to proper position, removing the scouring pad 41 for example, and installing another type of pad. Different pads having different degrees of coarseness or cleaning ability can be used interchangeably to further aid the housewife in her cleaning tasks. A number of different disks can be used, if desired, each having a different type of cleaning device installed thereon and one may merely replace a complete assembly onto the beater. The installation on the beater is simple, the disk is bent in reverse direction and the lugs will open up sufficiently so that they can be placed over the blades of the beater.

The beater will drive the holder and scouring pad in a rotary motion. The disk is flexible, as in the first form of the invention, and can fit into corners of pots and pans or other hard to get at places.

In FIGS. 12 and 13 there is shown a holder 30 which is identical to the holder shown in FIGS. 6 through 11. The holder 30 has a polishing head installed thereon. In this form of the invention the polishing head is a sheepskin or wool head 45 which is normally on a leather or other type of backing strip 46. As the prongs 34, 35 and 36 will not bite into the backing 46 the polishing head 45 has an elastic strap 47 attached thereto as at 48, 48 adjacent the outer edges thereof. The strap is slipped over the holder and placed between the pairs of lugs 32, 32 and 33, 33. The unit is then replaced on a beater as before and this device can be used for polishing under power.

The polishing head is driven through the use of this elastic strap and can be easily attached to and removed from the holder 30.

What is claimed is:

1. An attachment for a power rotatable mixer having a beater comprised of a driven shaft and four flat blade-like elements intersecting at the bottom of the beater and extending at substantially right angles to each other and fixedly attached to said driven shaft, said attachment including:
    a disc-like member made of a flexible material,
    at least one pair of brackets fixedly attached to an upper surface of said disc-like member, said brackets being positioned opposite each other and adapted to have the upper portions thereof open when said disc-like member is bent in a U-shape in a first direction,
    a plurality of prongs arranged in rows fixedly attached to and extending downwardly from a bottom surface of said flat disc-like member, outer rows of said prongs having lower portions thereof bent inwardly toward the opposite outer row, said disc-like member being adapted to be bent into a U-shape in a second direction to permit installation of a cleaning device onto said beaters, said prongs being positioned to grip said cleaning device when said disc-like member returns to a planar position.

2. An attachment for a power rotatable mixer having a beater, said attachment comprising:
    a substantially flat disc made of a flexible material,
    means for attaching said flat disc in driving relationship to said beater,
    a plurality of prongs fixedly attached to the bottom surface of said flat disc and extending downwardly therefrom, said prongs being arranged in at least two substantially parallel rows, said prongs further having lower end portions thereof bent in direction toward the other row of prongs, said disc being adapted to be bent into a U-shape so that said prongs are separated and in position to receive a cleaning device, said disc being sufficiently resilient so that it returns to a substantially planar position after said cleaning device has been positioned on said prongs.

3. The combination as specified in claim 2 and a center row of prongs arranged midway between said two rows and extending substantially parallel thereto, said center row of prongs being substantially straight throughout their length.

4. The combination as specified in claim 2 wherein said means for attaching said flat disc to said beater comprises two aligned pairs of lugs, each of said lugs having a shank and a tip portion positioned at substantially 90 degrees to said shank and facing the other lug of the pair, said lugs being sufficiently flexible to open to permit them to slide over the blades of said beater to position with said tip portions over the top of said beater blades.

5. An attachment for a power rotatable mixer having a beater, said attachment comprising:
    a substantially flat disc made of a flexible material,
    means for attaching said flat disc in driving relationship to said beater,
    a plurality of prongs fixedly attached to the bottom surface of said flat disc and extending downwardly therefrom, at least some of said prongs having lower end portions thereof bent in direction to form a hook shape, said prongs being oriented so that as said beater rotates the lower end portions of at least some of said hook-shaped prongs rotationally lead the upper portions of the same prongs, and an abrasive pad engaged with the hook portions of at least some of said prongs and driven by said beater.

References Cited by the Examiner

UNITED STATES PATENTS

| | | |
|---|---|---|
| 1,445,696 | 2/23 | Lively. |
| 1,905,307 | 4/33 | Schulhoff _____ 15—209.51 |
| 2,496,972 | 2/50 | Wolfe _____ 15—230.1 |
| 2,650,385 | 9/53 | Michel _____ 15—235 |
| 2,822,562 | 2/58 | Shackelford _____ 15—230.1 |
| 3,059,679 | 10/62 | Resk. |
| 3,090,065 | 5/63 | Krieps et al. _____ 15—209.51 |

FOREIGN PATENTS 574,820  4/24  France.

WALTER A. SCHEEL, *Primary Examiner.*